US 10,539,145 B2

(12) United States Patent
Ellwood et al.

(10) Patent No.: US 10,539,145 B2
(45) Date of Patent: Jan. 21, 2020

(54) OIL DEFLECTOR WITH OIL GUIDE

(71) Applicant: BorgWarner Inc., Auburn Hills, MI (US)

(72) Inventors: Erwin Perry Ellwood, Candler, NC (US); Aliihsan Karamavruc, Fletcher, NC (US); Davide Peduto, Mannheim (DE)

(73) Assignee: BorgWarner Inc., Auburn Hills, MI (US)

(*) Notice: Subject to any disclaimer, the term of this patent is extended or adjusted under 35 U.S.C. 154(b) by 103 days.

(21) Appl. No.: 15/560,176

(22) PCT Filed: Mar. 18, 2016

(86) PCT No.: PCT/US2016/023030
§ 371 (c)(1),
(2) Date: Sep. 21, 2017

(87) PCT Pub. No.: WO2016/153963
PCT Pub. Date: Sep. 29, 2016

(65) Prior Publication Data
US 2018/0080455 A1 Mar. 22, 2018

Related U.S. Application Data

(60) Provisional application No. 62/138,480, filed on Mar. 26, 2015.

(51) Int. Cl.
F04D 29/063 (2006.01)
F01M 11/02 (2006.01)
(Continued)

(52) U.S. Cl.
CPC ......... F04D 29/063 (2013.01); F01D 25/183 (2013.01); F01M 11/02 (2013.01);
(Continued)

(58) Field of Classification Search
CPC .. F01D 25/183; F04D 29/063; F04D 2220/40; F04D 2220/22407;
(Continued)

(56) References Cited

U.S. PATENT DOCUMENTS 4,664,605 A    5/1987  Asano et al.
5,026,260 A *  6/1991  Gutknecht ............ F01D 25/125
                                                            184/6.11
(Continued)

FOREIGN PATENT DOCUMENTS

DE   102013005167 B3   9/2014
EP      2025892 A1      2/2009
(Continued)

OTHER PUBLICATIONS

International Search Report and Written Opinion dated Jun. 8, 2016, in International Application No. PCT/US2016/023030.

Primary Examiner — Igor Kershteyn
(74) Attorney, Agent, or Firm — Eric L. Doyle; Stephan A. Pendorf; Patent Central LLC

(57) ABSTRACT

An engine turbocharger (10) includes a radially oriented oil deflector (50) that incorporates an oil guiding feature (70) to improve control of a continuous turbulent mass of oil being impelled against the deflector by an oil flinger (35). The oil deflector (50) has a downwardly extending tongue (60) to assist in directing oil flow from a thrust bearing chamber. The feature (70), formed on the tongue (60), enhances otherwise gravitationally directed oil flow into an engine oil sump. The feature is vertically oriented, and redirects oil thrown axially and rotationally against the deflector, providing improved piston ring sealing through more efficient evacuation of oil from the thrust bearing chamber. The feature may be formed by stamping, as either an integral disruptive surface rib, or as an otherwise radially oriented flange protruding axially from the surface of the tongue.

(Continued)

Such flange may be integral with, or otherwise attached to, the oil deflector tongue, as for example via welding.

5 Claims, 3 Drawing Sheets

(51) Int. Cl.
*F01D 25/18* (2006.01)
*F02C 6/12* (2006.01)

(52) U.S. Cl.
CPC .......... *F02C 6/12* (2013.01); *F01M 2011/021* (2013.01); *F05D 2220/40* (2013.01); *F05D 2240/70* (2013.01); *F05D 2260/602* (2013.01)

(58) Field of Classification Search
CPC ..... F04D 2260/602; F02C 6/12; F01M 11/02; F01M 2011/021
See application file for complete search history.

(56) References Cited

U.S. PATENT DOCUMENTS

| | | | |
|---|---|---|---|
| 6,418,722 B1 * | 7/2002 | Arnold | F01D 25/168 417/407 |
| 8,398,363 B2 * | 3/2013 | Mundinger | F01D 25/16 415/111 |

FOREIGN PATENT DOCUMENTS

| | | |
|---|---|---|
| FR | 2746849 A1 | 10/1997 |
| JP | 61202648 U | 12/1986 |
| JP | 0941982 A | 2/1997 |
| JP | 2004132319 A | 4/2004 |

* cited by examiner

OIL DEFLECTOR WITH OIL GUIDE

CROSS-REFERENCE TO RELATED APPLICATION

This is a PCT Application claiming priority under 35 U.S.C. § 119(e) to U.S. Provisional Application Ser. No. 62/138,480 filed on Mar. 26, 2015.

TECHNICAL FIELD

This disclosure relates generally to turbochargers utilized to enhance internal combustion engine performance, and in particular to improvements in turbocharger lubrication oil sealing.

BACKGROUND

Turbochargers are used to enhance performance of otherwise normally aspirated internal combustion engines. They are typically centrifugal compressors driven by exhaust gas turbines that boost engine power, curtail emissions, and improve fuel economy. Rather than being belt-driven by the engine, as are superchargers, the typical turbocharger relies only upon exhaust energy for its power, and as such is designed to rotate at speeds considerably higher than those of superchargers.

The challenges of satisfactorily lubricating turbochargers are well known by those skilled in the art. Normally a single shaft connects an exhaust driven turbine wheel to a compressor wheel. The shaft is journaled within a pair of spaced sleeve bearings along its length, and includes a shoulder at the compressor wheel end configured to support a thrust bearing. At the thrust bearing end, an oil flinger and an oil deflector are designed to work in concert to drive oil away from piston rings secured about the shaft by keeping the bulk of the oil on the thrust bearing side of the deflector. As such, lubrication oil sealing systems are generally designed to avoid any oil leakage past the piston rings; i.e. to minimize chances of oil entering the compressor section of the turbocharger.

Turbochargers can spin well over 100,000 RPM. Numerous enhancements have been made to increase their longevity, particularly as related to issues of lubrication. For example, ceramic bearings have been used in some applications, while various improvements in oil circulation have been achieved in others. As packaging requirements have continued to reduce physical spaces allotted to under-the-hood components including turbochargers, however, additional improvements related to oil flinger and oil deflector componentry are needed to assure continued effectiveness of turbocharger oil sealing systems.

SUMMARY OF THE DISCLOSURE

In accordance with one aspect of the present disclosure, an engine turbocharger includes an oil flinger and a radially oriented oil deflector spaced from the oil flinger, the turbocharger having piston ring seals adapted to be shielded by the deflector. The deflector includes a downwardly depending tongue configured to direct oil into an associated engine sump. An axially protruding oil guiding feature formed on the oil deflector tongue improves control of oil being impelled against the oil deflector by the oil flinger, and the oil guiding feature is configured to enhance the gravitational movement of oil into an engine sump.

In accordance with another aspect of the present disclosure, the oil deflector has an annular baffle portion spaced axially from the oil flinger, and the oil guiding feature on the oil deflector tongue is defined by a downwardly oriented rib axially raised from a face of the oil deflector tongue for directing turbulent oil received from the baffle portion of the oil deflector.

In accordance with yet another aspect of the present disclosure, the oil guiding feature on the oil deflector tongue is defined by a downwardly asymmetrically oriented flange axially raised from the face of the oil deflector tongue for directing oil received from the baffle portion of the oil deflector.

In accordance with a still further aspect of the present disclosure, the baffle portion is configured to receive turbulent oil from the oil flinger, and to redirect the oil along a controlled path to the oil deflector tongue.

In accordance with a still further aspect of the present disclosure, an oil deflector configured for operation in an engine turbocharger includes a radially extending baffle portion configured for fixed securement to a turbocharger housing, proximal to an axially extending rotating bearing shaft. The oil deflector further includes a tongue depending downwardly from the baffle portion, and an oil guiding feature formed on the tongue to enhance gravitational flow of oil from the baffle portion, downwardly over the tongue.

In accordance with yet another aspect of the present disclosure, a method of making an oil deflector for operation in an engine turbocharger includes the steps of forming a radially extending baffle portion configured for securement about an axially extending bearing shaft, forming a tongue on the baffle portion to depend downwardly from the baffle portion, and forming an oil guiding feature on the tongue to enhance gravitational flow of oil from the baffle portion downwardly over the tongue.

These and other aspects and features will be more readily understood upon reading the following detailed description when taken in conjunction with following drawings.

Figure 1:
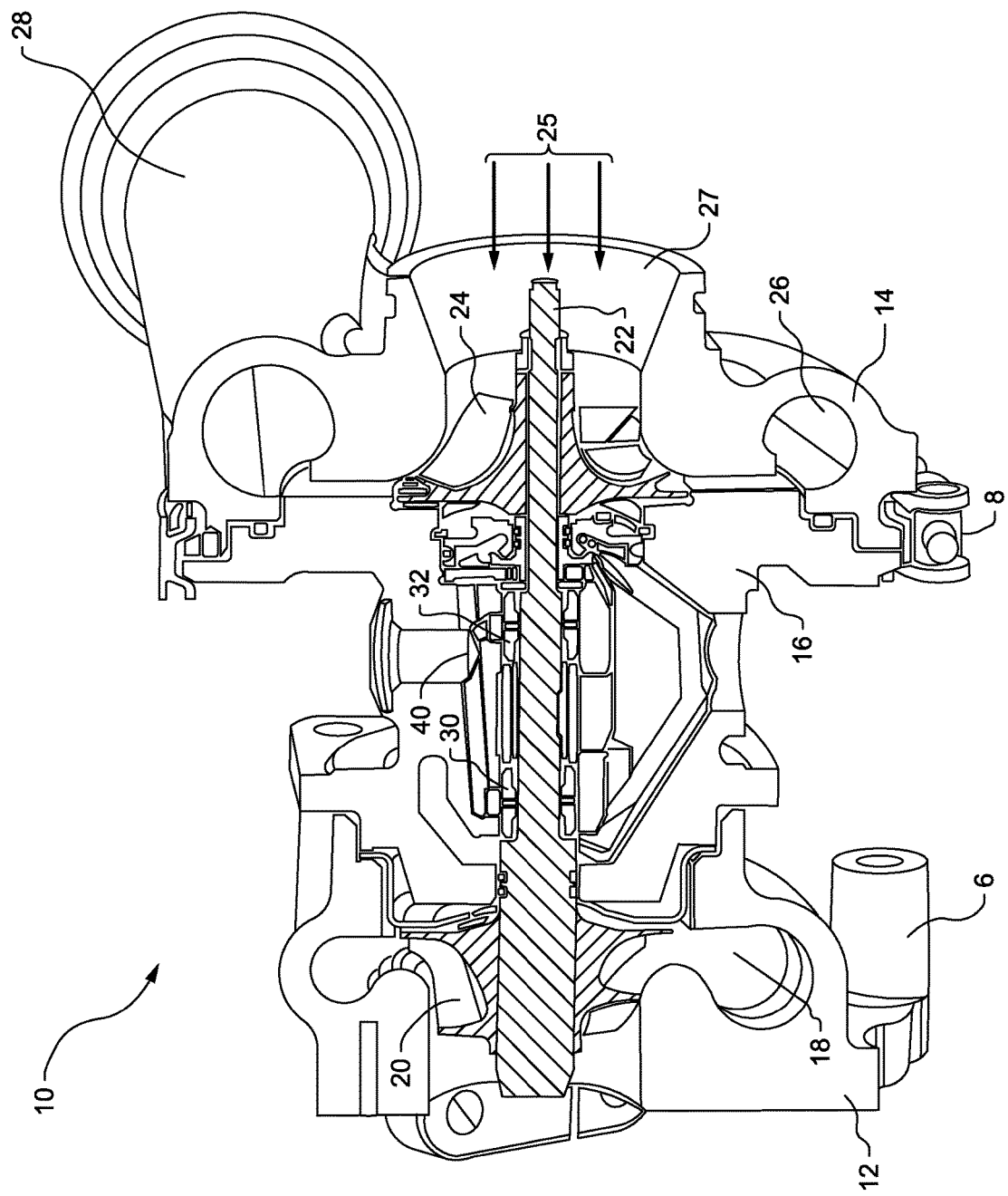
FIG. 1 is a cross-sectional view of a turbocharger of the type which may incorporate an oil deflector of the present disclosure.

The various illustrative embodiments of the present disclosure, as depicted in the drawings and described in detail herein, are susceptible to modifications and alternative constructions. As such, numerous equivalent constructions may fall within the spirit and scope of the present disclosure.

DETAILED DESCRIPTION

Although the following description specifically only addresses two embodiments, each embodiment presented is intended to be only exemplary. Numerous alternative embodiments are not described herein that could be implemented in accordance with this disclosure, and may fall within the scope of the appended claims. Moreover, none of the terms recited in the claims are intended to be limiting, by implication or otherwise.

Making initial reference to FIG. 1, a turbocharger 10 generally includes at least a pair of mounting connectors 6 and 8 for securement to an associated engine (not shown). The turbocharger 10 includes a turbine housing 12 at one end, a compressor housing 14 at an opposite end, and a bearing housing 16 situated intermediately of, and bolted rigidly to each of, the turbine and compressor housings 12, 14.

The turbine housing 12 includes passageways for receiving high-energy exhaust gases from an engine manifold (not shown). Those skilled in the art will appreciate that the exhaust gases are directed to a turbine wheel 20 mounted for rotation within the turbine housing 12, as is conventional in the art of turbochargers.

The turbine wheel 20 is fixedly secured to one end of a rotatable shaft 22, which extends from the turbine housing 12 through the bearing housing 16 and into the compressor housing 14. Secured to the opposite end of the shaft 22 is a compressor wheel 24, configured to compress atmospheric air, shown as arrows 25, received into the compressor housing 14 through an intake air inlet 27. Atmospheric air 25 is compressed within an annular passageway 26 in conventional fashion, prior to exiting to the engine through a compressed air outlet 28. As such, those skilled in the art will appreciate that actual turbocharger power for compression of atmospheric air 25 is initiated at the turbine wheel 20, which rotates the shaft 22 via the energy of the noted exhaust gases received from the engine manifold.

Figure 2:
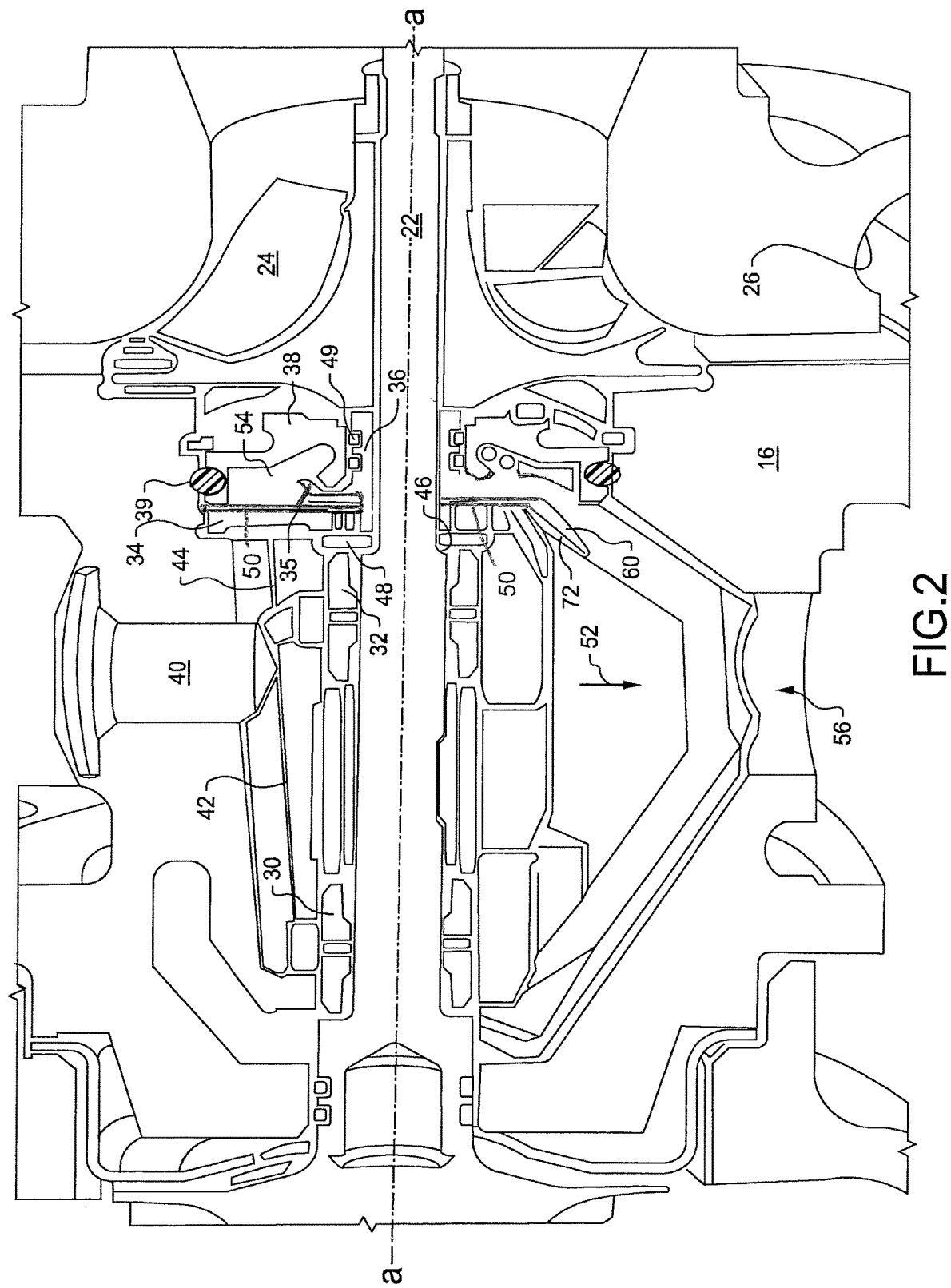
FIG. 2 is a cross-sectional view of an enlarged portion of the turbocharger of FIG. 1.

Referring now to FIG. 2, the shaft 22 is supported by a pair of spaced sleeve or so-called "journal" bearings 30 and 32 for rotation about an axis "a-a". Within the bearing housing 16 near its interface with the compressor housing 14, is a radially oriented thrust bearing 34, configured to accommodate high boost pressures and thrust loads acting on the compressor wheel 24 during normal operation of the turbocharger 10.

Proximal to the thrust bearing is an oil flinger 35 sleeved to the shaft 22 via a sleeve 36 for rotation therewith. As disclosed, the oil flinger 35 and the sleeve 36 are formed as a single part or component. Situated between the compressor wheel 24 and the flinger 35 is a non-rotating thrust bearing insert 38, circumferentially secured to the bearing housing 16, and sealed with respect thereto by an O-ring 39.

Those skilled in the art of turbochargers will appreciate that high-pressure oil enters an oil inlet 40. A portion of the oil travels through passages 42 to the sleeve bearings 30 and 32, while the balance travels through passage 44 to the thrust bearing 34. As noted, the thrust bearing 34 must handle loads generated by the compressor wheel 24 within the compressor housing 14. For this purpose, the shaft 22 includes a shoulder 46 supporting a thrust washer 48 that receives the thrust load of the bearing. The flinger sleeve 36 and the thrust washer 48 form a collar around the thrust bearing 48 that is configured to receive thrust loads in both axial directions.

A pair of axially spaced piston rings 49, radially interposed between the flinger sleeve 36 and the thrust bearing insert 38, is configured to minimize travel of the high-pressure oil from a thrust bearing oil chamber 54 to the interface between the thrust bearing insert 38 and the compressor wheel 24. This arrangement is intended to achieve an ultimate goal of keeping the oil away from and out of the compressor housing 14.

Figure 3A:
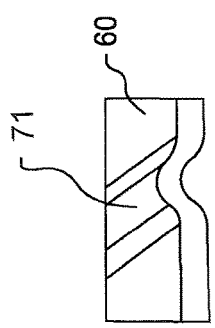
FIG. 3A is a partial perspective view of the oil guide feature of the embodiment of FIG. 3.
Figure 3:
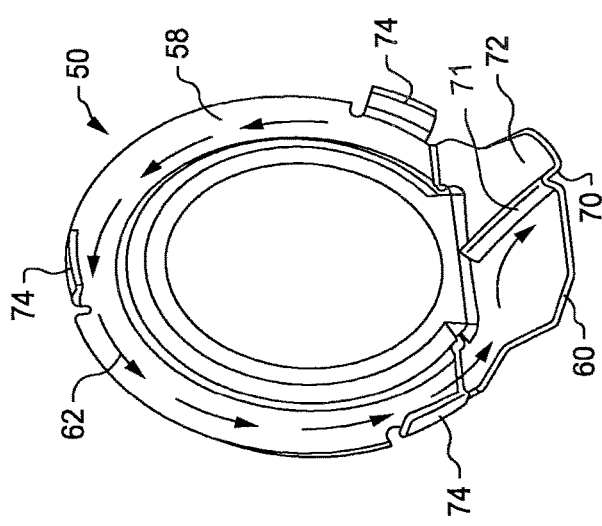
FIG. 3 is a perspective view of a portion of one embodiment of an oil deflector of the present disclosure.

Referring now to FIGS. 2 and 3, a non-rotatable oil deflector 50 is axially secured to the bearing housing 16, between the thrust bearing insert 38 and the flinger 35 (both shown only in FIG. 2). The oil deflector 50 is configured to receive any oil that travels past the thrust bearing 34, reaching the flinger 35. Although the amount of such oil is intended to be minimized, as controlled principally by tight tolerances, the rotating flinger 35 is configured to axially and rotatably fling or impel such oil to the oil deflector 50 for its gravitational return (see return arrow 52 in FIG. 2), through an oil drain 56, and into an oil sump of an associated engine (neither shown). For this purpose, the oil deflector 50 includes a tongue 60, angled downwardly from an annular baffle portion 58 that surrounds the shaft 22. The tongue 60 and its oil receiving face 72 are the only two portions of the oil deflector that are shown in FIG. 2.

Referring now specifically to FIGS. 3 and 3A, the radially extending annular baffle portion 58 physically receives oil impelled from the flinger 35 in a pattern indicated by arrows 62, reflecting a general circular path along which oil will travel when received from the rotating flinger 35. To the extent that gravitational forces on the oil transferred from the baffle portion 58 to the tongue 60 may be insufficient to effectively urge the oil downwardly from the tongue to the sump, the tongue 60 includes an oil guiding feature 70, as shown. Axially extending circumferentially spaced tabs 74 on the baffle portion 58 facilitate positioning of the oil deflector 50 to the bearing housing 16.

FIG. 3A reveals an enlarged portion of the oil guiding feature 70, which is defined by a radially oriented rib 71, protruding or raised axially from the face 72 of the tongue 60, as shown. The raised rib 71 is thus configured to arrest or at least to disrupt the turbulent shearing action of the oil received on the tongue 60, to thus urge the oil more forcefully toward the sump. The ribs may be angled somewhat from vertical in order to more smoothly transition the turbulent oil flow into the sump. As such, the rib 71 can be oriented asymmetrically rather than having a straight vertically downward orientation. The rib 71 may be formed on the face 72 via stamping or other means, as will be appreciated by those skilled in the art of metalworking.

Figure 4A:
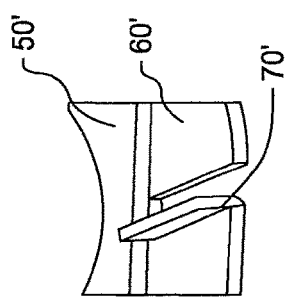
FIG. 4A is a partial perspective view of the oil guide feature of the embodiment of FIG. 4.
Figure 4:
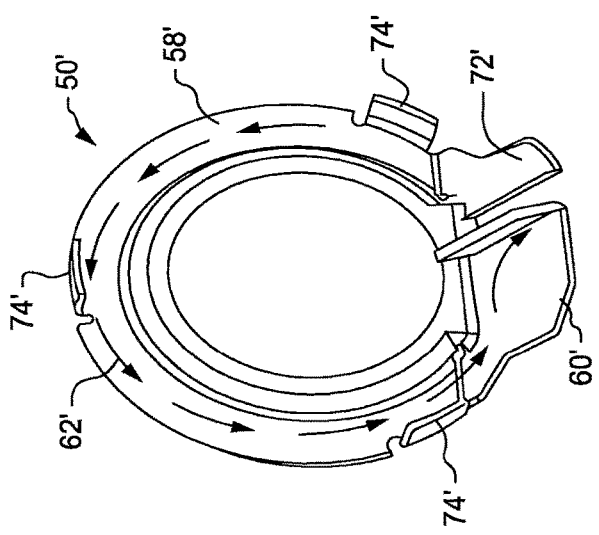
FIG. 4 is a perspective view of a portion of a second embodiment of an oil deflector of the present disclosure.

Referring now to FIG. 4, an oil deflector 50' portrays an alternate embodiment of the feature 70'. The alternate feature 70' may be formed as a stamped flanged portion, tabbed upwardly from an otherwise flat face 72' of the tongue 60', revealing a gap as shown that results from such formation of the flange. Such a flanged portion may alternatively be welded as a separate member to the tongue 60' to create the same effect in terms of providing an axially protruding structure configured to disrupt the turbulent flow of oil along the face 72' of the tongue 60' for a more efficient return of the oil to the oil sump.

Finally, a method of making an oil deflector, for operation in an engine turbocharger having a bearing housing, may include the steps of forming a radially extending annular baffle portion configured for securement to the bearing housing about an axially extending rotary bearing shaft, forming a generally planar tongue on the baffle portion to depend downwardly from the baffle portion, and forming an oil guiding feature on the tongue to enhance gravitational flow of oil from the baffle portion downwardly over the tongue.

The method may further include the oil guiding feature formed as a rib having either a vertically or asymmetrically oriented, radially protruding, profile defined by an axially raised portion on the face of the tongue.

INDUSTRIAL APPLICABILITY

This disclosure has applicability in turbochargers for vehicular engines or non-vehicular engines, including industrial engines that may utilize high-pressure oil designed to be recirculated from and to a sump.

Although only two operative oil deflector embodiments have been depicted and described herein, alternate embodiments may be configured to provide for a more efficient return of recirculating oil to sump in accordance with this disclosure.

What is claimed is:

1. An oil deflector (50) for an engine turbocharger (10), the oil deflector (50) having a baffle portion (58) and a tongue (60) depending downwardly from the baffle portion (58), the oil deflector (50) comprising:
 a radially oriented, axially protruding, oil guiding feature (70) formed on the oil deflector tongue (60) for improved control of oil being impelled against the oil deflector (50) by an oil flinger (35), the oil guiding feature (70) configured to enhance gravitational movement of oil into an engine sump, wherein the oil guiding feature (70) is asymmetrically oriented on the tongue (60).

2. The oil deflector (50) of claim 1, wherein the oil guiding feature (70) is vertically oriented on the tongue (60).

3. An oil deflector (50) for an engine turbocharger (10), the oil deflector (50) having a baffle portion (58) and a tongue (60) depending downwardly from the baffle portion (58), the oil deflector (50) comprising:
 a radially oriented, axially protruding, oil guiding feature (70) formed on the oil deflector tongue (60) for improved control of oil being impelled against the oil deflector (50) by an oil flinger (35), the oil guiding feature (70) configured to enhance gravitational movement of oil into an engine sump, wherein the oil guiding feature comprises a rib (71).

4. The oil deflector (50) of claim 1, wherein the oil guiding feature (70) comprises a flange (70').

5. A method of making an oil deflector (50) for operation in an engine turbocharger (10), the method comprising the steps of:
 forming a radially extending annular baffle portion (58) configured for securement to a bearing housing (16) about an axially extending rotary bearing shaft (22);
 forming a generally planar tongue (60) on the baffle portion (58) to depend downwardly from the baffle portion (58); and
 forming an oil guiding feature (70) on the tongue (60) to enhance gravitational flow of oil from the baffle portion (58) downwardly over the tongue (60);
 wherein the oil guiding feature (70) is an asymmetrically oriented, radially protruding rib (71) defined by an axially raised portion on the tongue (60).

* * * * *